United States Patent
Martucci et al.

(10) Patent No.: US 7,156,125 B2
(45) Date of Patent: Jan. 2, 2007

(54) COAXIAL HOSE ASSEMBLY AND METHOD OF MAKING SAME

(75) Inventors: Norman S. Martucci, Clarkston, MI (US); Rich Hahn, Sterling Heights, MI (US)

(73) Assignee: Teleflex Fluid Systems, Inc., Suffield, CT (US)

( * ) Notice: Subject to any disclaimer, the term of this patent is extended or adjusted under 35 U.S.C. 154(b) by 0 days.

(21) Appl. No.: 10/663,112

(22) Filed: Sep. 15, 2003

(65) Prior Publication Data

US 2005/0056332 A1    Mar. 17, 2005

(51) Int. Cl.
*F16L 11/00* (2006.01)
(52) U.S. Cl. .................. 138/116; 138/115; 138/137; 138/DIG. 3; 428/36.91
(58) Field of Classification Search ............ 138/115, 138/116, 137, 141, 109, DIG. 3; 428/36.91
See application file for complete search history.

(56) References Cited

U.S. PATENT DOCUMENTS

| | | | | |
|---|---|---|---|---|
| 2,340,926 A | * | 2/1944 | Bradley .................. 285/124.5 |
| 3,747,632 A | * | 7/1973 | Kok et al. .................. 137/375 |
| 3,941,157 A | * | 3/1976 | Barnett .................. 138/115 |
| 4,038,489 A | * | 7/1977 | Stenson et al. .......... 174/70 R |
| 4,343,844 A | * | 8/1982 | Thayer et al. ............ 428/34.9 |
| 4,496,823 A | * | 1/1985 | Mann .................. 219/137.41 |
| 5,236,016 A | * | 8/1993 | Vogelsang .................. 138/115 |
| 5,501,840 A | * | 3/1996 | Mantovani et al. ......... 422/101 |
| 5,566,720 A | * | 10/1996 | Cheney et al. ............. 138/137 |
| 5,611,373 A | * | 3/1997 | Ashcraft .................... 138/113 |
| 5,613,524 A | * | 3/1997 | Martucci .................... 138/137 |
| RE35,527 E | * | 6/1997 | Martucci ..................... 174/47 |
| 5,692,545 A | * | 12/1997 | Rodrigue .................... 138/115 |
| 5,947,953 A | * | 9/1999 | Ash et al. .................... 604/508 |
| 6,190,349 B1 | * | 2/2001 | Ash et al. .................... 604/43 |
| 6,203,873 B1 | * | 3/2001 | Shifman et al. ............ 428/36.8 |
| 6,230,749 B1 | * | 5/2001 | Kertesz .................... 138/137 |
| 6,311,730 B1 | * | 11/2001 | Penza .......................... 138/98 |
| 6,424,772 B1 | * | 7/2002 | Blazer et al. ............... 385/110 |
| 6,769,454 B1 | * | 8/2004 | Fraser et al. ................ 138/127 |
| 2001/0013675 A1 | * | 8/2001 | Nakagawa et al. ......... 264/513 |
| 2002/0011047 A1 | * | 1/2002 | Obeshaw .................... 52/794.1 |

\* cited by examiner

*Primary Examiner*—James Hook
(74) *Attorney, Agent, or Firm*—Baker & Hostetler LLP

(57) ABSTRACT

The present invention, there is provided a hose assembly having a tubular first layer containing therein multiple compartments 11 for carrying fluids in an automobile. Also disclosed is a method of making a hose assembly by forming a multiple compartment first layer for carrying fluids in an automobile.

9 Claims, 1 Drawing Sheet

COAXIAL HOSE ASSEMBLY AND METHOD OF MAKING SAME

BACKGROUND OF THE INVENTION

1. Technical Field

The present invention relates to a coaxial hose construction. More specifically, the subject invention relates to a coaxial hose assembly for use in an automobile.

2. Background Art

Hose assemblies for conveying fuels are well known in the art. Such assemblies are exposed to a variety of fuel mixtures and fuel additives in addition to extreme engine temperatures. Thus, such hose assemblies must be chemically as well as heat resistant to degradation as a result of chemical and heat exposure.

Polymeric fluorocarbon materials such as polytetrafluoroethylene possess the requisite chemical and temperature resistant properties for most fuel hose applications. Unfortunately, however, polymeric fluorocarbon materials exhibit relatively poor tensile and hoop strengths. As a consequence, such fluorinated materials are prone to kinking. Such kinking remains permanent and provides a continual resistance to fluid flow through the hose assembly. Moreover, as a result if the fluorinated material's low tensile strength, attachment of securing or coupling members to the hose assembly is unreliable.

Various approaches have been described for offering additional strength to a polymeric fluorocarbon liner. One approach involves braiding fibers about the inner fluorocarbon liner. The braided fibers offer additional strength to the fluorocarbon liner resulting in a hose assembly that resists kinking. An example of such an approach is disclosed in co-pending U.S. Ser. No. 535,734, filed Jun. 11, 1990 and assigned to the assignee of the subject invention. A drawback to such braiding techniques, however, is the extensive labor and time involved.

Additional examples for strengthening an inner fluorocarbon liner with an outer layer are shown in U.S. Pat. No. 2,991,808 to Siegmann, U.S. Pat. No. 4,104,095 to Shaw, and U.S. Pat. No. 4,800,109 to Washizo, all of which disclose the use of a polytetrafluroethylene inner liner supported within an outer liner.

Finally, U.S. Pat. No. 3,547,162 to Schaerer discloses a pipe assembly wherein an inner cross-linked polyolefin liner is supported within an expanded urethane or PVC outer liner.

Also disclosed in the prior art are hose assemblies, which included multiple compartments for carrying fluids. Examples of this are U.S. Pat. No. 2,929,408 to Weatherwax et al, U.S. Pat. No. 3,567,134 to Smith and U.S. Pat. No. 4,729,409 to Paul. These patents pertain to the use of hose assemblies for containing therein water and/or cables. Specifically, U.S. Pat. No. 3,567,134 to Smith discloses a flexible hose having partitioned walls within the main cylindrical wall. This hose assembly is used for delivering water. While this patent does disclose the use of multiple compartments within a hose assembly, there is no disclosure of such an assembly for use in a fuel system. As fuel systems have additional issues relating to standards for permeability and conductiveness, there is no disclosure in the prior art or suggestion for creating a multiple compartment hose assembly for use in an automobile.

It would therefore be useful to develop a hose assembly, which has multiple compartments, which can be used in an automobile.

SUMMARY OF THE INVENTION

According to the present invention, there is provided a hose assembly having a tubular first layer containing therein multiple compartments for carrying fluids in an automobile. Also disclosed is a method of making a hose assembly by forming a multiple compartment first layer for carrying fluids in an automobile.

DESCRIPTION OF THE DRAWINGS

Other advantages of the present invention are readily appreciated as the same becomes better understood by reference to the following detailed description when considered in connection with the accompanying drawings wherein.

DETAILED DESCRIPTION OF THE INVENTION

Generally, the present invention provides a coaxial hose assembly 10 having a first layer, which contains therein multiple compartments 11 for carrying fluids therethrough in an automobile. The multiple compartments 11 are made while the hose assembly 10 itself is being formed. Therefore, the hose assembly 10 and compartments 11 are formed of and defined by a single material.

By "integrated" as used herein it is meant that the multiple compartments 11 of the hose assembly 10 are made as a single unit with the first layer 12 and as such cannot be separated.

Figure 2:
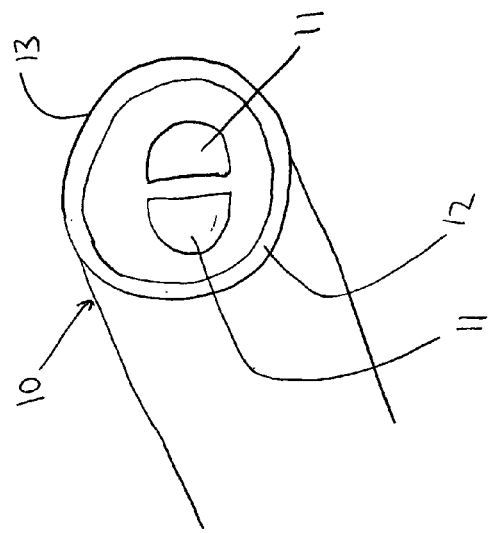
FIG. 2 is a cross-sectional view of one embodiment of coaxial hose assembly of the present application.
Figure 3:
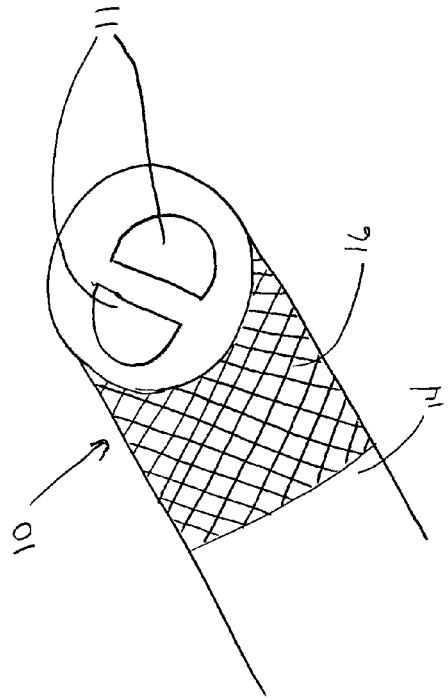
FIG. 3 is a side view, partially cut away of the coaxial hose assembly of the present invention.
Figure 1:
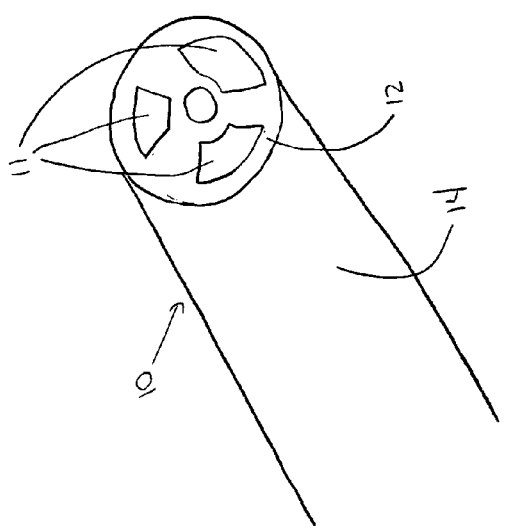
FIG. 1 is a side view partially cut away of the coaxial hose assembly of the present invention.

In the preferred method of making the hose assembly 10 of the present invention, the hose assembly 10 is extruded and during the extrusion process the multiple compartments 11 are formed therein. As can be seen by FIG. 2, at least three compartments 11 can be contained within the hose assembly 10. This can include but is not limited, to a fuel line 11', return line 11" and a vacuum 11'". By utilizing the vacuum 11'" to surround the fuel 11' and return lines 11" collapse of the hose assembly 10 is prevented. This also enables cheaper materials to be used in formulating the hose assembly, thereby lowering the cost of the hose assembly. Examples of cheaper materials include FEP and PTFE, and other components known to those of skill in the art. Cheaper materials can be utilized in this embodiment because the vacuum around the return and fuel lines 11' prevents the escape of any extraneous gases into the rest of the automobile. As this is a major concern with hose assemblies in an automobile, the use of the vacuum prevents the permeability or escape of any extraneous gases or fluid, thus solving both the problem of permeability in a hose assembly 10 and also solving the problems associated with cost of the hose assembly 10. Alternatively, the hose assembly 10 can include multiple compartments 11 around the perimeter of the hose assembly 10 as can be seen by FIG. 1. Preferably, when this configuration is desired, a stabilizing hose 11"" is placed in the middle of the hose assembly. The stabilizing hose 11"" prevents the collapse of the hose when it is crimped onto or coupled to another part of the automobile.

A hose assembly made in accordance with the present invention is generally shown at 10 in FIG. 1. The assembly 10 includes a tubular first layer 12, and optionally a jacket 14 disposed about the first layer. The assembly 10 can also include a conductive layer 16 disposed about the first layer 12, and a coupler 18 adapted to engage the ends of the hose assembly 10.

The tubular first layer 12, as best shown in FIG. 1 includes a polymeric material resistant to both chemical and heat degradation, thus allowing a variety of fluids, particularly automotive fuels, fuel additives, e.g., detergents, alcohols, etc., and brake fluid to pass through the first layer 12 without corroding or degradating the first layer 12. The first layer 12 is preferably extruded using well-known melt or paste extrusion techniques and has a wall thickness of between 0.001 and 0.120 inches. Although the first layer 12 can be made of any number of polymeric materials, the first layer 12 is ideally made from a polymer of the following: polytetrafluoroethylene (PTFE), the homopolymer of tetrafluoroethylene sold under the trademark TEFLON® by DuPont; perfluorinated ethylene-propylene (FEP), the copolymer of tetrafluoroethylene and hexafluoropropylene sold under the trademark TEFLON® FEP by DuPont; perfluoralkoxy fluorocarbon resin (PFA), the copolymer of tetrafluoroethylene-perfluorovinyl ether sold under the trademark TEFLON® PFA by DuPont; or ethylene tetrafluoroethylene (ETFE), the copolymer of ethylene and tetrafluoroethylene sold under the trademark TEF-ZEL by DuPont; or PVDF or THV. In addition to the aforementioned polymeric fluorocarbon materials, polychlorotrifluoroethylene, the homopolymer of chlorotrifluoroethylene, and polychlorotfifluoroethylene-ethylene, the copolymer of chlorotrifluoroethylene and ethylene can also be used.

Preferably, the first layer 12 can be made of an unexpanded polymeric fluorocarbon material. Alternatively, the first layer 12 is made of an expanded polymeric fluorocarbon material, as shown in FIG. 1. Although expanded and unexpanded polymeric fluorocarbon first layers 12 both offer the hose assembly 10 increased hoop and tensile strength, the unexpanded polymeric fluorocarbon material is preferred. The expansion process, commonly known in the art as "foaming", generally takes place while extruding the first layer 12. Such foaming processes generally require blowing agents such as CELOGEN HT 550™, an exothermic blowing agent sold by Uniroyal Chemicals or ACTIVEX 537™, an endothermic blowing agent sold by J. M. Huber Corporation, or any other gas or chemical base capable of "foaming" the polymeric material. The blowing agent is generally intermixed with the polymeric material during the extrusion of the first layer 12 and causes expansion of the polymeric fluorocarbon by producing gas, thereby forming void spaces within the first layer 12.

The jacket 14, best shown in FIG. 1, is disposed about the first layer 12. The jacket 14 comprises a material, such as a polyketone, ETFE, nylon alloy, PFA, TPE, etc. for increasing the abrasion of the hose assembly 10. While the jacket can be made of a polymeric material, it is not limited to such materials, and can instead include any material known to those of skill in the art. More specifically, the jacket 14 allows the first layer 12 to be bent in a tighter radius without kinking. That is, the jacket 14 assists in the distribution of stress to the first layer 12 upon bending. Thus, by disposing the jacket 14 about the first layer 12, the hoop strength of the first layer 12 is increased. Further, the jacket 14 adds to the working pressure of the hose. That is, the jacket 14 provides strength to the first layer 12 and allows the first layer 12 to accommodate a fluid under pressure. Additionally, the jacket 14 adds to the tensile strength of the hose assembly 10. When coupling members 18 are disposed on the ends of the hose assembly 10, as described below, the jacket 14 increases the tensile strength of the hose assembly 10 sufficiently to fixedly connect the coupling member 18 to the hose assembly 10.

Although the jacket 14 can be made of any number of materials, preferably the jacket 14 is made from a polyamide material selected from the following: nylon alloy; nylon 6; nylon 6,6; nylon 11; or nylon 12. It should be noted the selection of a particular polyamide material should be based upon the physical requirements of the particular hose assembly application. For example, nylon 6 and nylon 6,6 offer higher heat resistant properties than nylon 11 or nylon 12, whereas nylon 11 and nylon 12 offer better chemical resistant properties than nylon 6 or nylon 6,6. Thus, the ultimate selection of a polyamide material should be based upon requirements of a particular hose assembly application. In addition to those polyamide materials previously mentioned, other nylon materials such as: nylon 6,12; nylon 6,9; nylon 4,6; nylon 7; and nylon 8 can also be used. Ring containing polyamides including aliphatic-aromatic polyamides e.g., nylon 6. T and Transpereut or Amorphous nylon can also be used. Finally, the jacket 14 can also comprise various polyamide blends. Again, it is noted that the selection of a particular polyamide material is dependent upon the specific physical requirements of a particular hose assembly application.

Preferably, the jacket 14 comprises an unexpanded polyamide material. Alternatively, the jacket 14 is comprised of an expanded polyamide material, as shown in FIG. 1. Although expanded and unexpanded polyamide jacket 14 both offer the hose assembly 10 increased hoop and tensile strength, the unexpanded polyamide material is preferred. The expansion process, commonly known in the art as "foaming", generally takes place while extruding the jacket 14. Such foaming processes generally require blowing agents such as CELOGEN HT 550™, an exothermic blowing agent sold by Uniroyal Chemicals or ACTIVEX 537™, an endothermic blowing agent sold by J. M. Huber Corporation. The blowing agent is generally intermixed with the polyamide material during the extrusion of the jacket 14 and causes expansion of the polyamide by producing gas, thereby forming void spaces within the jacket 14.

Methods for fabricating the present hose assembly 10 are well known in the art. One particularly well-known method involves a two-part extrusion process typically known as "cross-head" extrusion. The typical "cross-head" extrusion method involves first extruding a first layer 12, such as the polymeric fluorocarbon first layer 12, then extruding a conductive layer 13 thereover. This method of fabrication is particularly effective when utilizing a first layer 12 comprising polytetrafluoroethylene. This is primarily due to the difficulty encountered in extruding polytetrafluoroethylene. That is, polytetrafluoroethylene generally must be paste extruded whereas thermoplastic polymeric fluorocarbon materials can often be melt extruded. When utilizing thermoplastic polymeric fluorocarbon materials, coextrusion methods of fabricating can be applicable. As commonly known in the art, coextrusion methods involve utilizing two extruders at once thereby forming both the first layer 12 and a conductive layer 13 simultaneously.

The assembly can also be made using the following method. Additionally, the foamed structure can be formed by utilizing both a chemical blowing agent formulated with the melt extrudable fluoropolymer material prior to extrusion and by injecting a physical forming agent such as in inert gas into the barrel of the extruder as described above.

The control of void size and void content is critical as these parameters affect both the flexibility and permeability of the product. For example, an extruded tubular structure having a high content of small voids yields a more flexible tubular structure. A tubular structure having a low content of large voids yield a more rigid foamed tubular structure. In general, the void content of the tubular structure 10 can range from approximately 5–85%. Preferably, the void content ranges from approximately 20% to 50%. Also, in the preferred embodiment of the present invention, the voids or cells are closed. Closed cells or voids are preferred over open voids or cells as open cells can allow the migration and/or collection of fluids within the wall 16 of the tubular structure 10.

The amount of closed cells versus open cells in the extrudate can be varied by controlling factors such as the die temperature, melt temperature of the polymer, and the amount of blowing agent used.

During the extrusion of the expanded tubular structure 10, a skin can be formed on either the outer surface 12, inner surface 14, or both surfaces of the extruded tubular structure 10. As described above, the skin is a thin layer, which can be varied in thickness. The skin creates a substantially smooth surface, which defines the margins of the inner and/or outer diameters of the tubular structure 10.

The skin can be formed by several methods. A preferred method of forming the skin on either the outer surface 12, the inner surface 14, or both includes cooling or chilling either the mandrel, the die, or both to cause the formation the skin. By cooling or chilling the mandrel, the inner diameter of the tubular structure 10 or the inner surface 14 of the tubular structure 10, a skin can be formed. Likewise, by cooling or chilling the die, the outer diameter of the tubular structure 10, or outer surface, 12, the skin can be formed. The temperature necessary to cause the formations of the skin ranges from 350 to 700° F. depending on the polymer used. Also, a cooling bath or vacuum chamber can be used to retain the small cell structure, which has been generated and to prevent blow holes on the surfaces of the foamed article.

The vacuum chamber can include a cooling or quenching fluid, such as water, which causes the substantially molten expanded fluoropolymer material comprising expanded tubular structure 10 to solidify. This solidifying step can also occur outside of the vacuum chamber. That is, the extrudate can pass through the vacuum chamber and into a separate zone or container wherein it contacts the cooling fluid where the molten fluoropolymer material is solidified.

At this point, the formation of the expanded tubular structure 10 is substantially complete. As described above, a hose assembly 10 can be constructed by disposing at least one outer layer 14 about the tubular inner liner 12. The outer layer 14, as described above, can be disposed about the tubular inner layer 12 either by extrusion, braiding, or other techniques known to those skilled in the art. The methods for applying the outer layer 14 about the tubular layer 12 are described in detail above.

Additionally, the first layer 12 can be a conductive layer. In this embodiment, the first layer 12 contains therein conductive material such as carbon black. This is accomplished by intermixing the conductive material throughout the polymeric material while the first layer 12 is extruded.

Due to the chemical inertness and general lubricous nature of polymeric fluorocarbon materials, relative movement between the inner 12 and outer 14 liners is often encountered. In hose applications, which require immobility among adjacent liners, the present hose assembly 10 can be modified to eliminate such relative movement between the inner 12 and outer 14 liners.

An embodiment for a limiting relative movement between the first layer 12 and jacket 14 is shown in FIG. 1. This embodiment includes disposing at least one braided layer 16 between the first layer 12 and jacket 14. More specifically, the embodiment includes a braided or woven layer 16 disposed in an inter-weaving fashion, or wrapped about the outer surface of the first layer 12. Preferably, the material used for the braided layer 16 is an Aramid blend. Aramid fibers are preferred due to Aramid's heat resistance. These fibers are not impacted by heat of the process, therefore heat does not disturb the braid angle which is critical in protecting the hose from kinking.

The braided layer 16 can either be attached or unattached to the inner liner 12 prior to the extrusion of the outer liner 14. Preferably the braided layer 16 is not attached and thus when the outer liner 14 is extruded over the braided layer 16 and the inner liner 12, this action serves to hold the braided layer 16 in its proper place.

The braided or woven fibers can be tightly wound or they can be loosely wound about the inner liner 12. When loosely bound, the fibers have wide gaps between adjacent fibers. The outer liner 14 is then extruded about the braided layer 16. This allows the braided layer 16 to be attached firmly to both the outer liner 14 and the inner liner 12 without requiring the use of any sort of emulsion or other adhesive or dispersing agent.

While Aramid alone is the preferred material to be used for the braided layer 16, additional compositions can be utilized. One such composition includes the addition of glass fibers into the Aramid braid thus further preventing any elongation or expansion of the tube of the braided layer 16 relative to the first layer 12 and jacket 14.

An essential aspect of the braided layer 16 is that the fibers which form the braided layer 16 must be properly twisted and be braided to the proper braid angle, which results in a fiber which can pass both a whip test and a volume expansion test eg. As per FMVSS 106, SAE J1401 etc.

While the braid layer 16 can be utilized for preventing relative movement in the first layer 12 and jacket 14 as shown in FIG. 1, it can also be used when the jacket 14 is not included with the hose. Preferably the braid layer is attached immediately after the first layer 12 is formed. This occurs while the first layer 12 is still hot, therefore the braid can readily affix to the exterior of the first layer 12. The braid layer functions to roughen the surface of the first layer 12, therefore when a jacket 14 is applied thereabout the braid serves to etch the Teflon® surface and create a proper bonding between the first layer 12 and the jacket 14. Additionally, etching can be made on the exterior of the first layer 12. Etching techniques are well known in the art. Examples of common etching techniques include acid treatment, plasma treatment, and a mechanical scuffing. Subsequent to etching, the outer surface of the first layer maintains an irregular configuration. Essentially, the irregular configuration creates a rough surface having a plurality of cavities and protuberances therein.

Subsequent to etching the outer surface of the first layer 12, the jacket 14 is extruded thereover. During this extrusion, the inner surface of the jacket 14 shapes into making an engagement with the irregular configuration of the outer surface of the first layer 12 thereby resulting in a mechanical and/or chemical bond therebetween. These bonds prohibit relative movement between the first layer 12 and the jacket 14.

While Aramid alone is the preferred material to be used for the braided layer 16, additional compositions can be utilized. One such composition includes the addition of glass fibers into the Aramid braid thus further preventing any elongation or expansion of the tube of the braided layer 16 relative to the first layer 12 and jacket 14.

As fluid flows through the first layer 12, electrical charges tend to build throughout the length of the first layer 12. Therefore, in an additional embodiment of the present invention, in order to prevent these electrical charges from accumulating, the first layer 12 preferably includes an integral longitudinal conductive means coextensive with the length of the first layer 12 for conducting an electrical charge along the length of the first layer 12. Preferably the integral conductive means comprises a conductive layer 13 containing carbon black, as shown in FIG. 1. Alternatively, the integral conductive layer 13 can be included in the first layer 12 with the carbon black being included in the composition of the first layer 12 as shown in FIG. 1. Therefore, the integral conductive compound can be interdispersed throughout the first layer 12 by intermixing carbon black throughout the polymeric material while the first layer 12 is extruded. The braided layer 16, intermediate coating, and first layer 14 are all preferably electrically non-conductive. This is important in that electrical charges applied to the exterior of the hose assembly 10 are not conducted along its length nor to the fluid passing therethrough. It is appreciated that the integral conductive means can comprise conductive material other than carbon black.

The assembly 10 further includes coupler. The coupler is adapted to engage the ends of the hose assembly 10 to a flow of fluid, e.g., brake fluid flows to and from the brakes. More particularly, the coupler includes a coupler or joint having an insert portion for inserting into and engaging the inner surface of the first layer 12. The insert portion can have a plurality of barbs for engaging the inner surface of the first layer 12. The coupler can also include an engaging portion extending longitudinally from the insert portion for engaging a fitting. The engaging portion can comprise a male threaded member or female threaded member. The engaging portion can comprise any configuration that cooperates with the member to which it is to be connected with. For example, the engaging portion can comprise a socket to receive a mating ball joint. Alternatively, in place of the engaging portion, the coupler can provide an additional insert portion for inserting into and engaging the interior surface of the first layer 12 of another hose assembly 10 as shown in FIG. 1. Thus, the coupler can operate as a joint between independent hose assemblies 10 thereby interconnecting them to allow fluid flow therebetween. The coupler is preferably made from a metal material and mechanically connected to the hose assembly 10. Alternatively, the coupler can be crimp or clamped, or otherwise connected or molded to the hose assembly.

Although the present hose assembly has been described for conveying brake fluid, it will be readily appreciated that the present hose assembly 10 can be used for conveying a variety of fluids, e.g., cooling fluids, lubricating fluids, brake fluids, etc.

Throughout this application, various publications, including United States patents, are referenced by author and year and patents by number. Full citations for the publications are listed below. The disclosures of these publications and patents in their entireties are hereby incorporated by reference into this application in order to more fully describe the state of the art to which this invention pertains.

The invention has been described in an illustrative manner, and it is to be understood that the terminology, which has been used is intended to be in the nature of words of description rather than of limitation.

Obviously, many modifications and variations of the present invention are possible in light of the above teachings. It is, therefore, to be understood, that within the scope of the appended claims wherein reference numerals are merely for convenience and not to be in any limiting, the invention can be practiced otherwise than as specifically described.

What is claimed is:

1. A hose assembly consisting of a tubular first layer containing therein multiple compartment means for carrying fluids therethrough within an automobile wherein said first layer is a polymeric fluorocarbon material and a jacket disposed directly over said first layer, and wherein said tubular first layer has a substantially continuous outer circumference.

2. The hose assembly according to claim 1, wherein said hose assembly and said compartment means are a single integrated unit.

3. The hose assembly according to claim 1, wherein said jacket is made of a polymeric material.

4. The hose assembly according to claim 3, wherein said jacket polymeric material is a polyamide.

5. The hose assembly according to claim 4, wherein said jacket polyamide is selected from the group consisting essentially of nylon 6, nylon 6, 6, nylon 11, and nylon 12.

6. The hose assembly according to claim 1, wherein said first layer further includes conductive means for conducting electrical charges.

7. The hose assembly according to claim 6, wherein said conductive means is carbon black.

8. A method of making a hose assembly, the method comprising:
forming an integrated multiple compartment first layer of a polymeric material for carrying fluids in an automobile and having a substantially continuous outer circumference; and
forming a jacket directly over the first layer.

9. The method according to claim 8, wherein said forming step further includes extruding the first layer containing multiple compartments.

* * * * *